(12) United States Patent
Maki

(10) Patent No.: US 8,797,890 B2
(45) Date of Patent: Aug. 5, 2014

(54) COMMUNICATION APPARATUS, CONTROL METHOD THEREFOR, AND PROGRAM FOR IMPLEMENTING THE CONTROL METHOD

(75) Inventor: Nobuhiko Maki, Tokyo (JP)

(73) Assignee: Canon Kabushiki Kaisha (JP)

( * ) Notice: Subject to any disclaimer, the term of this patent is extended or adjusted under 35 U.S.C. 154(b) by 143 days.

(21) Appl. No.: 12/491,364

(22) Filed: Jun. 25, 2009

(65) Prior Publication Data

US 2009/0323546 A1 Dec. 31, 2009

(30) Foreign Application Priority Data

Jun. 25, 2008 (JP) .................................. 2008-166203

(51) Int. Cl.
*G01R 31/08* (2006.01)
*G06F 21/60* (2013.01)
*H04L 29/06* (2006.01)
*H04N 1/00* (2006.01)

(52) U.S. Cl.
CPC ........ *H04L 63/1408* (2013.01); *H04N 1/00222* (2013.01); *G06F 21/608* (2013.01); *H04N 2201/0094* (2013.01)
USPC .............................. 370/252; 370/235; 714/37

(58) Field of Classification Search
CPC ......... H04L 47/10; H04L 47/30; H04L 47/31; H04L 47/32; G06F 3/1296; G06F 3/1297; H04N 2201/0093; H04N 1/324; H04N 1/00209
See application file for complete search history.

(56) References Cited

U.S. PATENT DOCUMENTS

| | | | |
|---|---|---|---|
| 6,781,721 B2 * | 8/2004 | Toyoda et al. ................ | 358/402 |
| 6,842,620 B2 * | 1/2005 | Smith et al. ................ | 455/456.1 |
| 7,792,972 B2 * | 9/2010 | Kamata et al. ................ | 709/227 |
| 2006/0047724 A1 * | 3/2006 | Messing et al. ............... | 707/204 |
| 2006/0104278 A1 * | 5/2006 | Chang et al. .................. | 370/392 |
| 2008/0077604 A1 * | 3/2008 | Bharara ........................ | 707/101 |
| 2008/0204791 A1 * | 8/2008 | Yusa ........................... | 358/1.15 |
| 2009/0044254 A1 * | 2/2009 | Tian ................................ | 726/4 |
| 2009/0172443 A1 * | 7/2009 | Rothman et al. ............... | 713/323 |

FOREIGN PATENT DOCUMENTS

| | | |
|---|---|---|
| JP | 2000-056940 A | 2/2000 |
| JP | 2004-362386 A | 12/2004 |
| JP | 2007-156840 A | 6/2007 |
| JP | 2009-181351 A | 8/2009 |

OTHER PUBLICATIONS

Office Action issued in corresponding Japanese Patent Application 2008-166203 dated Jul. 10, 2012.

* cited by examiner

*Primary Examiner* — Kibrom T Hailu
(74) *Attorney, Agent, or Firm* — Rossi, Kimms & McDowell LLP

(57) ABSTRACT

A communication apparatus which can prevent leakage of confidential information transferred over a network when a fault occurring in a communication device is analyzed. A data is acquired via a communication line. When it is analyzed that a specific data is present in the acquired data, the specific data is deleted from a data portion of the acquired data, the data portion including the specific data. A data included in another portion of the acquired data other than the data portion having included the deleted specific data is stored.

15 Claims, 4 Drawing Sheets

COMMUNICATION APPARATUS, CONTROL METHOD THEREFOR, AND PROGRAM FOR IMPLEMENTING THE CONTROL METHOD

BACKGROUND OF THE INVENTION

1. Field of the Invention

The present invention relates to a communication apparatus having a data analysis function, a control method therefor, and a program for implementing the control method.

2. Description of the Related Art

Conventionally, there has been a method of sampling a packet flowing through a network communication channel to investigate the cause of a fault thereof when the fault occurs in a network communication device. According to the general method, a fault analyst connects a dedicated device for performing packet acquisition to a line concentrator such as a HUB and samples a packet flowing on a LAN (Local Area Network).

Further, the fault analyst uses the sampled packet to analyze the content of data in the packet sent and received by a network communication device to be investigated and determines a location at which irregular data is received or a location at which a response delay in response to the received packet occurs.

Then, in order to determine whether or not the locations caused the fault, the fault analyst investigates the cause by confirming the recurrence of the fault by sending the same packet to the network device and analyzing the source code responsible for the communication of the network device.

For such an operation of sampling and analyzing the packet, there is a packet filtering function for the purpose of securing a storage area of the packet acquisition device and reducing work load of the analysis operation. The filtering function can reduce the number of packets to be sampled and reduce the memory area for recording the sampled packets and the hard disk area for storing them for a long period of time by acquiring only the packets matching a specified condition. In addition, the number of man-hours required for the analysis can be reduced.

In general, filtering rules are often specified by the type of the network protocol. For example, a specific protocol such as the internet protocol (IP) and the address resolution protocol (ARP) can be filtered to sample packets associated with the protocol.

In addition, in each protocol, further filtering can be accomplished by using smaller factors. For example, in the IP protocol, advanced filtering can be accomplished by setting a specific DST address (destination address), a specific SRC address (source address), a specific higher layer protocol and more.

In recent years, network communication devices having a packet acquisition function have been widely used. This allows packets to be acquired without using a dedicated device for performing packet sampling. For this reason, even if packet sampling cannot be correctly performed by a dedicated device, such as in case of an environment in which a switching HUB is introduced, packet sampling can be performed.

In addition, recently, filtering specific to the usages and characteristics of the network device has been enabled. Unlike the above described filtering based on each type of the network protocol, the filtering specific to the function of the device can further improve fault analysis efficiency.

For example, conventionally, there has been a packet capturing technique capable of storing data in units of received print jobs for a network printer (see Japanese Laid-Open Patent Publication (Kokai) No. 2004-362386). According to this technique, when a fault occurs at printing via a network, only the print job in which the fault occurred can be extracted, thereby improving the analysis efficiency.

However, the above conventional packet acquisition method has a problem described below. Specifically, the above described packet capturing technique also enables the acquisition of confidential information transferred over the network. Here, typical confidential information is authentication information such as a password.

When a fault occurs in an image forming device as the network communication device, the fault analyst needs to acquire a packet transferred by the image forming device, but the packet may contain confidential information such as the password used by the individual person such as a client. In order to prevent such confidential information from leaking outside, there may be cases where the packet itself cannot be allowed to be acquired or the packet cannot be allowed to be taken outside for the analysis. In such cases, there may be a possibility that the fault analysis itself runs into trouble.

SUMMARY OF THE INVENTION

The present invention provides a communication apparatus which can prevent leakage of confidential information transferred over a network when a fault occurring in a communication device is analyzed, a control method therefor, and a program for implementing the control method.

In a first aspect of the present invention, there is provided with a communication apparatus having a data analysis function comprising an acquisition unit adapted to acquire a data via a communication line, a determination unit adapted to determine the type of the acquired data, an analysis unit adapted to analyze whether or not a specific data satisfying a predetermined condition is present in the acquired data, a deletion unit adapted to delete, when it is analyzed by the analysis unit that the specific data is present, the specific data from a data portion of the acquired data, the data portion including the specific data, and a storage unit adapted to store a data included in another data portion of the acquired data other than the data portion having included the deleted specific data, wherein said analysis unit analyzes the presence of the specific data differently depending on the type of the determined data.

According to the communication apparatus of the present invention, when data is analyzed, data excluding specific data, which is confidential information, can be acquired. Thereby, when a fault occurring in the communication device is analyzed, leakage of confidential information transferred over the network can be prevented.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiment thereof. It should be noted that the relative arrangement of the components, the numerical expressions and numerical values set forth in these embodiments do not limit the scope of the present invention unless it is specifically stated otherwise.

The embodiment of a communication apparatus, a control method therefor, and a program for implementing the control method in accordance with the present invention will be described with reference to drawings. The communication apparatus of the present embodiment is applied to an image forming device which is a network communication device connected to a network.

Figure 1:
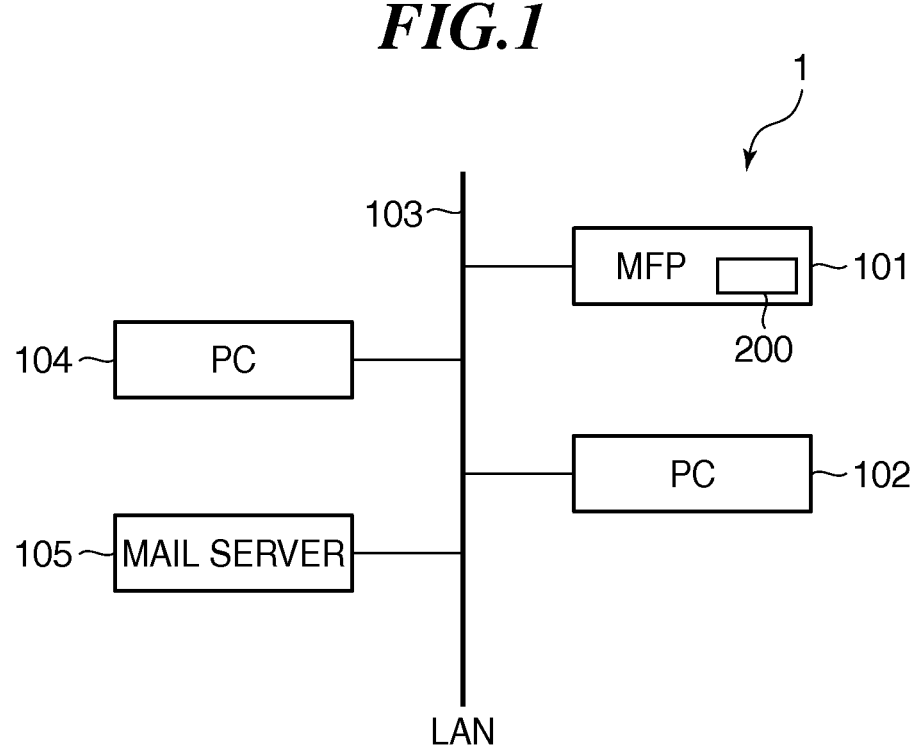
FIG. 1 is a view showing a configuration of a network system including an image forming device of an embodiment of the present invention.

FIG. 1 is a view showing a configuration of a network system including the image forming device of an embodiment of the present invention. In the network system 1 in FIG. 1, the network in a user environment is an Ethernet (registered trademark) LAN 103. The LAN 103 connects to a plurality of nodes each having a network interface. Here, the plurality of nodes include a multifunction device (MFP) 101, general personal computer (PCs) 102 and 104, and an email server 105.

The PC 102 has a controller unit 200 which includes a CPU (Central Processing Unit), storage devices, such as a RAM (Random Access Memory), a ROM (Read Only Memory), HDD (Hard Disk Drive), or the like, and a network interface, such as a NIC (Network Interface Card) or the like, as described later in FIG. 2. In addition, the PC 102 also includes a CD-ROM (Compact Disc Read Only Memory) drive as an external storage device (not shown), a USB (Universal Serial Bus) host interface (not shown), and buses for controlling the above devices and later described peripheral devices. Further, the peripheral devices connected to the main body of the PC 102 include a mouse, CRT display, a key board, and the like (not shown). The PC 104 has the same configuration as the PC 102.

The major software introduced in the PC 102 includes an OS (Operating Software) and Office software having functions such as a word processing function, a spreadsheet calculation function, and the like. The OS includes a port monitor for sending print data to a printer and the MFP 101 via the network as a function thereof. In addition, the OS also includes a mailer for sending and receiving email to and from a mail server 105 described later.

The mail server 105 is an email server responsible for sending and receiving emails using the SMTP (Simple Mail Transfer Protocol) and the POP (Post Office Protocol) 3. The email accounts of the MFP 101, the PC 102 and the PC 104 are set to the mail server 105. The individual nodes are set so as to be able to send emails via the mail server 105.

Figure 2:
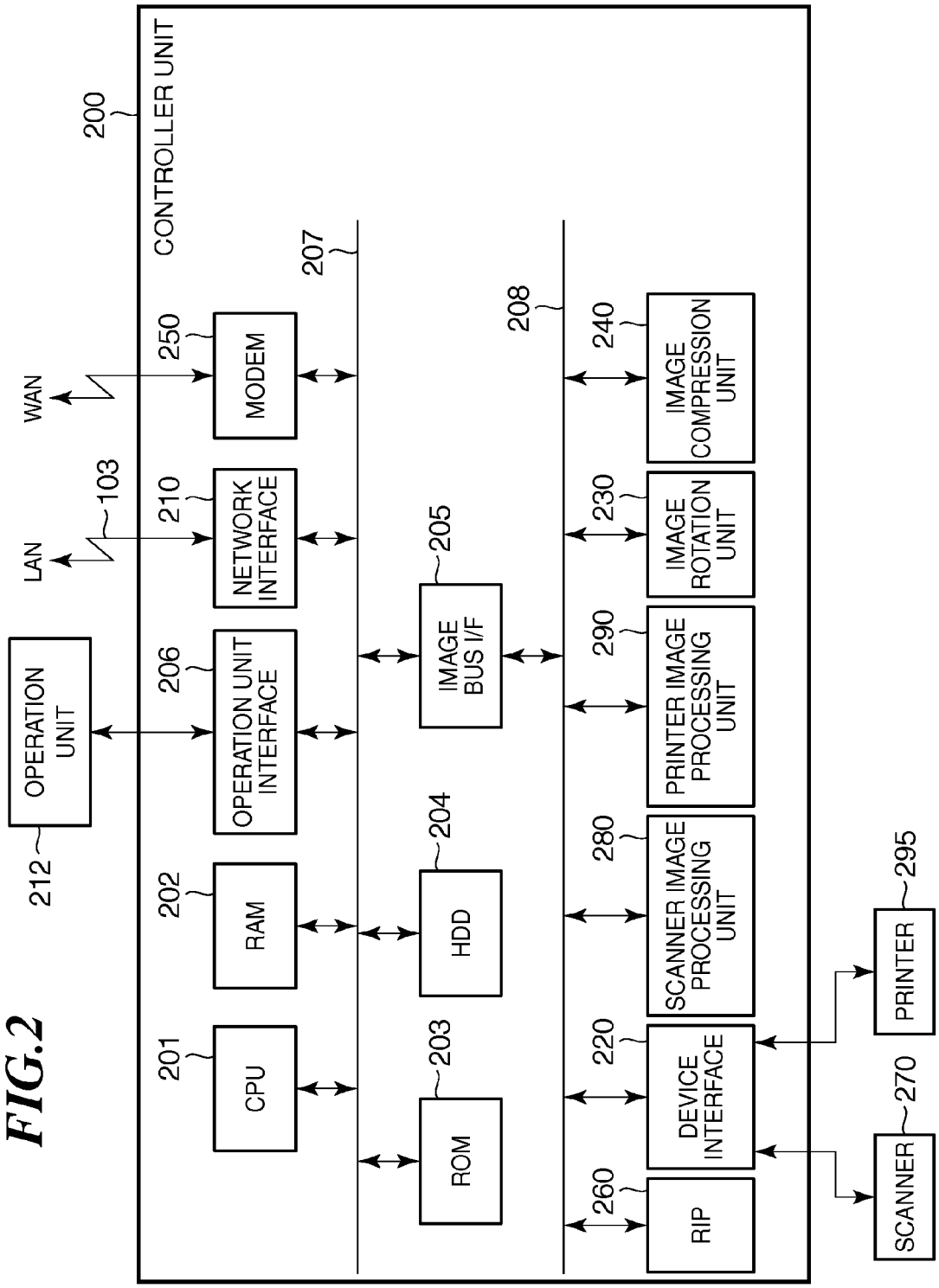
FIG. 2 is a block diagram showing an essential configuration of a hardware inside and around a controller unit of an MFP shown in FIG. 1.

FIG. 2 is a block diagram showing an essential configuration of the hardware inside and around the controller unit 200 of the MFP 101 shown in FIG. 1. In FIG. 2, the controller unit 200 connects to a scanner 270 which is an image input device and a printer 295 which is an image output device. The controller unit 200 performs control for achieving a copy function so that the printer 295 print-outputs the image data read by the scanner 270. In addition, the controller unit 200 connects to the LAN 103 and performs control for inputting and outputting the image information and the device information.

Specifically, the controller unit 200 has a CPU 201. The CPU 201 launches the operating system (OS) using a boot program stored in the ROM 203. Then, the CPU 201 performs various processes by executing an application 301 stored in an HDD (hard disk drive) 204 on the OS described later in FIG. 3. A RAM 202 is used as a work area of the CPU 201. The RAM 202 provides not only the work area but also an image memory area for temporarily storing image data. The HDD 204 stores the above application 301 as well as the image data.

In addition, an operation unit interface 206, a network interface 210, a modem 250, and an image bus interface 205 are connected to the CPU 201 via a system bus 207.

The operation unit interface 206 is an interface to an operation unit 212 having a touch panel, and outputs image data to an operation unit 212 to be displayed on the operation unit 212. In addition, the operation unit interface 206 transfers user-input information from the operation unit 212 to the CPU 201.

The network interface 210 is connected to the LAN 103, and transfers, via the LAN 103, information to and from each device on the LAN 103. The modem 250 is connected to a public line (not shown) and inputs and outputs information. The image bus interface 205 connects between the system bus 207 and an image bus 208 transferring image data at high speeds, and serves as a bus bridge for converting data structure.

The image bus 208 is composed of a PCI bus or an IEEE 1394. The image bus 208 includes a raster image processor (hereinafter referred to as a RIP) 260, a device interface 220, a scanner image processing unit 280, a printer image processing unit 290, an image rotation unit 230, and an image compression unit 240. The RIP 260 is a processor for converting a page description language (PDL) code into a bitmap image.

The device interface 220 connects to a scanner 270 and a printer 295, and converts synchronously or asynchronously both of image data inputted from the scanner 270 and image data outputted to the printer 295. The scanner image processing unit 280 corrects, processes, and edits the input image data. The printer image processing unit 290 performs printer correction, resolution conversion, and other processes on the output image data. The image rotation unit 230 rotates the above those image data. The image compression unit 240 compresses multi-value image data into JPEG data and compresses binary image data into JBIG, MMR, MH and other data as well as an expansion process thereof.

Figure 3:
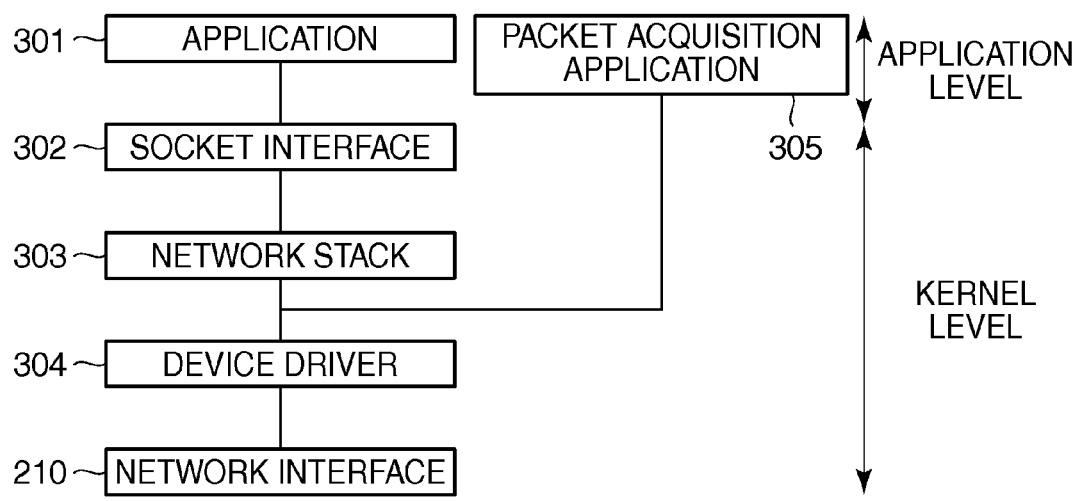
FIG. 3 is a view showing an essential configuration of a software in the MFP.

FIG. 3 is a view showing an essential configuration of the software in the MFP 101. The MFP 101 has a general purpose OS (Operation System). The application 301 is stored in an HDD 204, and is a set of network applications operating on the MFP 101. The detailed description of the network applications included in the application 301 will be later given with reference to FIG. 4.

A socket interface 302 is a socket interface program provided by the OS. When a network application included in the application 301 performs communication, the network application calls a socket interface 302 to enable a process of such as sending and receiving data. The socket interface is not always required for the network application to perform communication. However, the socket interface allows general purpose program instructions and processing flows to be used regardless of the type of OS, and thus the application development man-hours can be reduced. For this reason, in general, the network application calls the socket interface to send and receive data.

A network stack 303 is a group of protocol stacks. A network device driver 304 is a device driver of the network interface 210.

The packet acquisition application 305 is an application for acquiring a network packet to be transferred and received by the network interface 210 and outputting the log. The packet acquisition application 305 acquires all the packets received by the network interface 210 and all the packets transferred by the network interface 210 by acquiring data from the network device driver 304.

The application 301 and the packet acquisition application 305 operate at the application level. On the other hand, the socket interface 302, the network stack 303 and the network device driver 304 operate at the kernel level.

Figure 4:
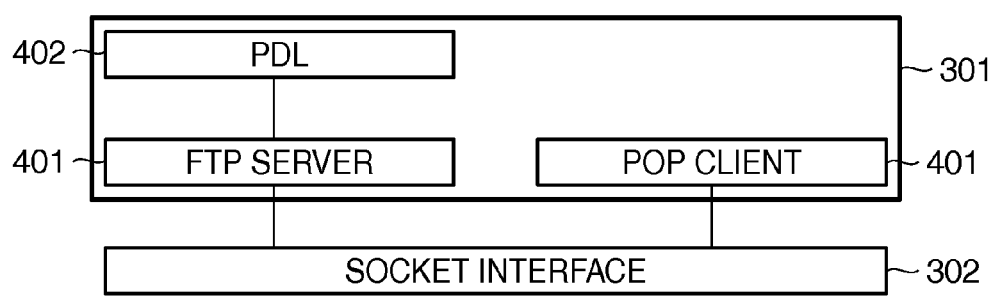
FIG. 4 is a block diagram showing a configuration of part of the network application included in an application shown in FIG. 3.

FIG. 4 is a block diagram showing a configuration of part of the network application included in the application 301 shown in FIG. 3. The application 301 includes a PDL 402, an FTP server 401, a POP client 403, and other network applications.

The FTP server 401 is a server program for transferring a file via a network using the FTP (File Transfer Protocol). When the PC 102 sends a print job file to the MFP 101 using the FTP, the FTP server 401 receives the print job file. The print job file received by the FTP server 401 is transferred to the PDL 402.

The PDL 402 is a program for expanding a print job. The data for the print job is written in a description language called PDL (Printer Description Language). The data includes not only print data but also information necessary for printing such as a sheet size and the number of copies. The PDL 402 expands the data for the print job written in PDL, converts the expanded data into video image data, and generates video data in accordance with the specified print attributes. The generated video data is transferred to the printer 295 to be printed.

The POP client 403 receives email from POP server using a POP (Post Office Protocol). The received mail contains an attached file stored in an image format such as a JPEG (Joint Photographic Experts Group) and a PDF (Portable Document Format). After receiving an email, the POP client 403 extracts the file attached thereto, converts the file into video data, and then transfers the data to the printer 295. The printer 295 performs a print process. According to the present embodiment, the POP server operates under the mail server 105; and the POP client 403 receives an email from the mail server 105.

Figure 5:
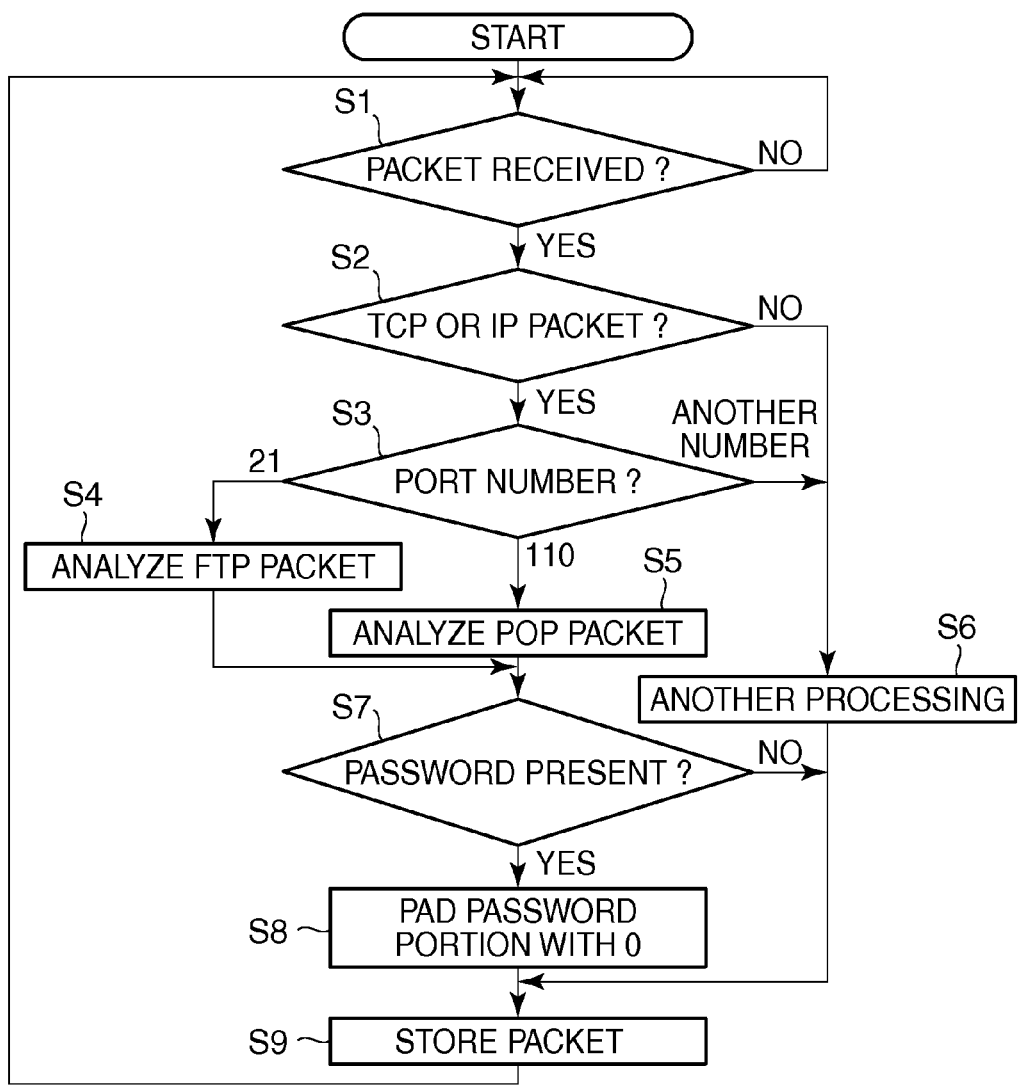
FIG. 5 is a flowchart showing the procedure of a packet acquisition process executed by the packet acquisition application shown in FIG. 3.

FIG. 5 is a flowchart showing the procedure of a packet acquisition process executed by the packet acquisition application 305 shown in FIG. 3. The process shows the procedure from receiving to analyzing and storing a packet. When the CPU 201 executes the packet acquisition application 305 stored in the hard disk 204, the process starts. The process also shows the procedure for deleting a password, which is confidential information, in the FTP packet and a password in the POP packet.

In this procedure, the FTP packet is processed when the FTP server 401 is operating. Likewise, in this procedure, the POP packet is processed when the POP client 403 is operating. It should be noted that according to the present embodiment, the description of the process of the other packets is omitted, but the processing method may be the same as that for the FTP packet and POP packet, or may be different therefrom.

When the packet acquisition application 305 is activated, the CPU 201 determines whether a packet is received or not (step S1). When it is determined that a packet is received from the LAN 103 via the network interface 210 and the device driver 304 (YES to step S1), the CPU 201 determines whether the received packet is a TCP/IP packet or not (step S2). More specifically, the determination is made based on the type of the Ethernet (registered trademark) frame, the presence or absence of the IP header, and the like.

Figure 6:
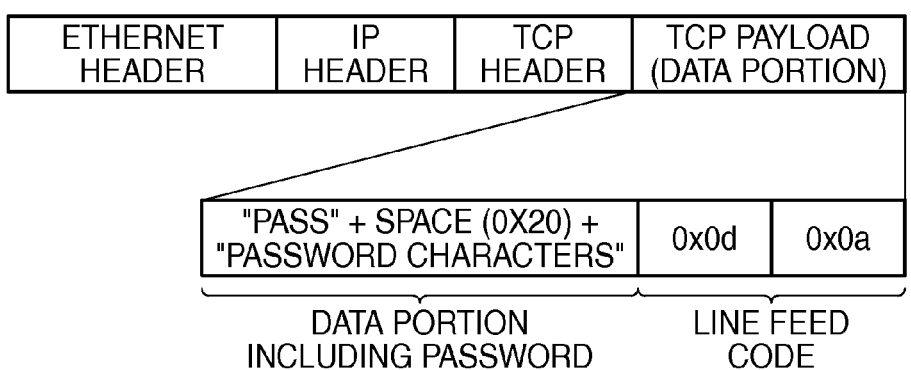
FIG. 6 is a view showing a format of an FTP packet and a POP packet to be analyzed in the flowchart in FIG. 5.

FIG. 6 is a view showing a format of an FTP packet and a POP packet to be analyzed in the flowchart in FIG. 5. As shown in FIG. 6, the FTP packet and the POP packet include the Ethernet (registered trademark) header, the IP header, and the TCP header. In step S2, with reference to the above header information, a determination is made as to whether the received packet is a packet used by the TCP/IP protocol.

When it is determined that the received packet is not a TCP/IP packet (NO to step S2), the CPU 201 performs the other processing (step S6). Here, the other processing includes a process for a packet other than the FTP packet and POP packet, but the description thereof is omitted in the present embodiment. It should be noted that nothing may be performed in step S6 depending on the embodiment. Then, the CPU 201 proceeds to the process in step S9.

On the other hand, when it is determined that the received packet is a TCP/IP packet (YES to step S2), the CPU 201 extracts a port number of the UDP header or the TCP header, and proceeds to a process according to the extracted port number (step S3).

When the port number is a value of 21, the CPU 201 analyzes the FTP packet (step S4). More specifically, the CPU 201 analyzes whether or not an FTP password is contained in the packet to be analyzed. In the case where the packet shown in FIG. 6 is to be analyzed, the analysis proceeds by analyzing the TCP payload portion in the packet. More specifically, the CPU 201 analyzes whether or not a character string "PASS" is present at the beginning of the TCP payload portion. When the character string "PASS" is present, the data (or specific data) followed thereby is determined as a password. Further, the CPU 201 analyzes how far apart in bytes the password portion is from the beginning of the packet and how many bytes the password portion consists of. The beginning of the packet can be found by detecting a line feed code (0x0d 0x0a). Then, the process proceeds to the process in step S7.

On the other hand, when it is determined in step 3 that the port number is a value of 110, the CPU 201 analyzes the POP packet (step S5). More specifically, as is the case with the process for the FTP packet, the CPU 201 analyzes whether or not a POP password is contained in the packet to be analyzed. In the case where the packet shown in FIG. 6 is to be analyzed, the analysis proceeds by analyzing the TCP payload portion in the packet. More specifically, the CPU 201 analyzes whether or not a character string "PASS" is present at the beginning of the TCP payload portion. When the character string "PASS" is present, the data (or specific data) followed thereby indicates a password. Further, the CPU 201 analyzes how far apart in bytes the password portion is from the beginning of the packet and how many bytes the password portion consists of. The beginning of the packet can be found by detecting a line feed code (0x0d 0x0a). Then, the process proceeds to the process in step S7.

On the other hand, in step S3, when it is determined that the port number is another value other than the above the process proceeds to the process step S6.

In step S4 or step S5, when the packet analysis is completed, the CPU 201 determines whether or not a password is present in the analyzed packet (step S7). If it is determined that no password is present, the CPU 201 stores the packet as it is (step S9). Then, the CPU 201 returns to the packet receiving process in step S1. It should be noted that in step S7, a determination is made as to whether or not a password is present in the packet, but the determination target in this process is not limited to the password as long as it is confidential information contained in the packet.

On the other hand, when it is determined in step S7, that a password is present, based on the result analyzed in step S4 or step S5, the CPU 201 deletes the password portion by padding (replacing) the password portion with a value of 0. Then, the CPU 201 stores the packet data excluding the deleted password portion (corresponding to data other than the specific data) (step S9), and returns to the process in step S1.

As described above, according to the image forming device of the present embodiment, when packet data is analyzed, the packet data excluding the confidential information can be acquired. Thereby, when a fault occurring in the image forming device is analyzed, leakage of confidential information can be prevented. Further, the recorded packet data does not contain confidential information as the specific data, and thus there is little possibility of leakage thereof. Therefore, the recorded packet data can be taken outside for analysis. In addition, analysis can be made as to the presence of specific data differently depending on the type of the packet data. Therefore, not only confidential information but also various kinds of specific data can be protected. Further, the specific data is replaced with a predetermined value, and thus the specific data can be easily deleted.

It should be noted that the present invention is not limited to the above embodiment, any configuration may be applied as long as the configuration can achieve the functions disclosed in claims or the functions disclosed in the present embodiment.

For example, the above embodiment shows the case where the MFP 101, which is the image forming device, acquires packet data, but the present invention may also be applied to the case where the PCs 102 and 104, which are information processing devices, acquire and analyze packet data.

Further, according to the above embodiment, a password, which is confidential information, is deleted from both the FTP packet and the POP packet, but a modification may be made such that the type of packet data is determined and then the specific data to be deleted is changed according to the determined type of packet data. For example, in the case of the POP packet, the destination and source addresses may be deleted so as to be hidden. Further, a user ID and other data may be deleted. Note that according to the format of a packet containing the user ID, the portion "PASS" shown in FIG. 6 is replaced with "USER" followed by a space and a character string of the user ID. In other words, in the same manner as in the method described in FIG. 5, a modification may be made such that the user ID portion is determined to be deleted. According to the present embodiment, not only confidential information but also various kinds of specific data can be protected.

Further, according to the above embodiment, when the specific data portion of the packet data is deleted, the entire specific data portion is replaced with a value of 0, but instead of a value 0, may be replaced with another value (for example, a value of 1). The replaced value may be any other value as long as the value does not imply the password. Alternatively, the specific data portion may be deleted without being replaced with other values.

Further, the above embodiment shows the case where packet data is acquired from the network communication apparatus connected to a network as the communication line, but the present invention is not limited to this, and can be applied to a case of acquiring data transferred between the devices connected to each other via a dedicated line.

Further, the present invention may be applied to not only a multifunction device (MFP) having a print function, a copy function, a scanner function and the like, but also a single function device such as a copy machine and a facsimile machine.

It is to be understood that the present invention may also be accomplished by supplying a system or an apparatus with a storage medium in which a program code of software, which realizes the functions of either of the above described embodiments is stored, and causing a computer (or CPU or MPU) of the system or apparatus to read out and execute the program code stored in the storage medium.

In this case, the program code itself read from the storage medium realizes the functions of either of the above described embodiments, and therefore the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of either of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of either of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all such modifications, equivalent structures and functions.

This application claims the benefit of Japanese Patent Application No. 2008-166203 filed Jun. 25, 2008, which is hereby incorporated by reference herein in its entirety.

What is claimed is:

1. A printing apparatus comprising:
   a reception unit configured to receive packet data of a first type of protocol and receive packet data of a second type of protocol;
   a printing unit configured to perform printing based on print data included in the received packet data of the first type of protocol and printing based on print data included in the received packet data of the second type of protocol;
   a determination unit configured to determine a type of protocol corresponding to the received packet data;
   a deletion unit configured to delete, if the determined type is the first type, specific data satisfying a first condition from the received packet data, and delete, if the determined type is the second type which is different from the first type, another specific data satisfying a second condition which is different from the first condition from the received packet data; and a storage unit configured to store the received packet data of the first type from which the specific data is deleted by the deletion unit and the received packet data of the second type from which the another specific data is deleted by the deletion unit, wherein the deleting by said deletion unit is for storing the received packet data in said storage unit and is not for performing the printing based on the print data included in the received packet data.

2. The printing apparatus according to claim 1, wherein the specific data is data indicating confidential information.

3. The printing apparatus according to claim 1, wherein said analysis unit analyzes how far apart in bytes the specific data is from the beginning of the packet data.

4. The printing apparatus according to claim 3, wherein said analysis unit analyzes how many bytes represent the specific data.

5. The printing apparatus according to claim 1, wherein the received packet data includes a header and a data portion.

6. The printing apparatus according to claim 5, wherein said determination unit extracts a port number from the header of the packet data, and determines the type of protocol corresponding to the packet data according to the extracted port number.

7. The printing apparatus according to claim 1, wherein, when said reception unit receives packet data without the specific data, said storage unit further stores the received packet data without the specific data.

8. The printing apparatus according to claim 1, wherein the packet data is stored in said storage unit to be accessible for a fault analysis.

9. The printing apparatus according to claim 1, wherein the deletion unit is configured to replace the specific data in the received packet data with other data to delete the specific data from the received packet data.

10. The printing apparatus according to claim 9, wherein the other data is a predetermined value.

11. The printing apparatus according to claim 5, wherein said deletion unit deletes the specific data from the data portion.

12. The printing apparatus according to claim 11, wherein said deletion unit replaces the specific data in the data portion with a predetermined value to delete the specific data from the data portion.

13. The printing apparatus according to claim 5, wherein, when it is analyzed by said analysis unit that the specific data is not present, said storage unit stores the header and the data portion without deleting the specific data from the packet data.

14. A control method for a printing apparatus, the control method comprising:

receiving packet data of a first type of protocol;
receiving packet data of a second type of protocol;
performing printing based on print data included in the received packet data of the first type of protocol;
performing printing based on print data included in the received packet data of the second type of protocol;
determining a type of protocol corresponding to the received packet data;
deleting, if the determined type is the first type, specific data satisfying a first condition from the received packet data;
deleting, if the determined type is the second type which is different from the first type, another specific data satisfying a second condition which is different from the first condition from the received packet data;
storing the received packet data of the first type from which the specific data is deleted in a storage unit; and
storing the received packet data of the second type from which the another specific data is deleted in the storage unit,
wherein the deleting is for storing the received packet data in the storage unit and is not for performing the printing based on the print data included in the received packet data.

15. A non-transitory computer-readable storage medium storing a program configured to be executed at least by a computer of a printing apparatus, the program comprising:

reception instructions configured to receive packet data of a first type of protocol and receive packet data of a second type of protocol;
printing instructions configured to perform printing based on print data included in the received packet data of the first type of protocol and printing based on print data included in the received packet data of the second type of protocol;
determination instructions configured to determine a type of protocol corresponding to the received packet data;
deletion instructions configured to delete, if the determined type is the first type, specific data satisfying a first condition from the received packet data, and delete, if the determined type is the second type which is different from the first type, another specific data satisfying a second condition which is different from the first condition from the received packet data; and
storage instructions configured to store the received packet data of the first type from which the specific data is deleted in a storage unit and the received packet data of the second type from which the another specific data is deleted in the storage unit,
wherein the deleting is for storing the received packet data in the storage unit and is not for performing the printing based on the print data included in the received packet data.

* * * * *